United States Patent [19]
Helmick

[11] Patent Number: 5,356,115
[45] Date of Patent: Oct. 18, 1994

[54] VACUUM RELIEF VALVE

[76] Inventor: B. J. Helmick, 303 Deborah Ct., Upland, Calif. 91786

[21] Appl. No.: 94,982

[22] Filed: Jul. 22, 1993

[51] Int. Cl.⁵ .......................... F16K 31/46; A47L 9/00
[52] U.S. Cl. ........................................ 251/294; 15/421
[58] Field of Search ................ 251/293, 294; 15/340.1, 15/375, 421

[56] References Cited

U.S. PATENT DOCUMENTS

| | | | |
|---|---|---|---|
| 1,594,052 | 7/1926 | Draver | 251/294 X |
| 2,642,089 | 6/1953 | Christie | 251/294 X |
| 3,277,512 | 10/1966 | Waters | 15/421 X |
| 3,360,234 | 12/1967 | Thorburn | 251/294 X |
| 3,633,239 | 1/1972 | Meyerhoefer | 15/421 X |
| 3,938,217 | 2/1976 | Hommes | 15/421 X |
| 4,099,551 | 7/1978 | Billington et al. | 251/294 X |
| 4,184,291 | 1/1980 | Marton | 15/421 X |

*Primary Examiner*—John Rivell
*Attorney, Agent, or Firm*—Boniard I. Brown

[57] ABSTRACT

A valve which is particularly suited for use as a vacuum relief valve in an industrial vacuum cleaning system and which the vacuum operator may quickly and easily open from any position throughout a full 360 degrees about the valve to cut off the suction at the intake end of the vacuum system suction hose in the event the hose becomes blocked or some part of the vacuum operator's body or clothes is accidentally sucked into the intake end.

26 Claims, 2 Drawing Sheets

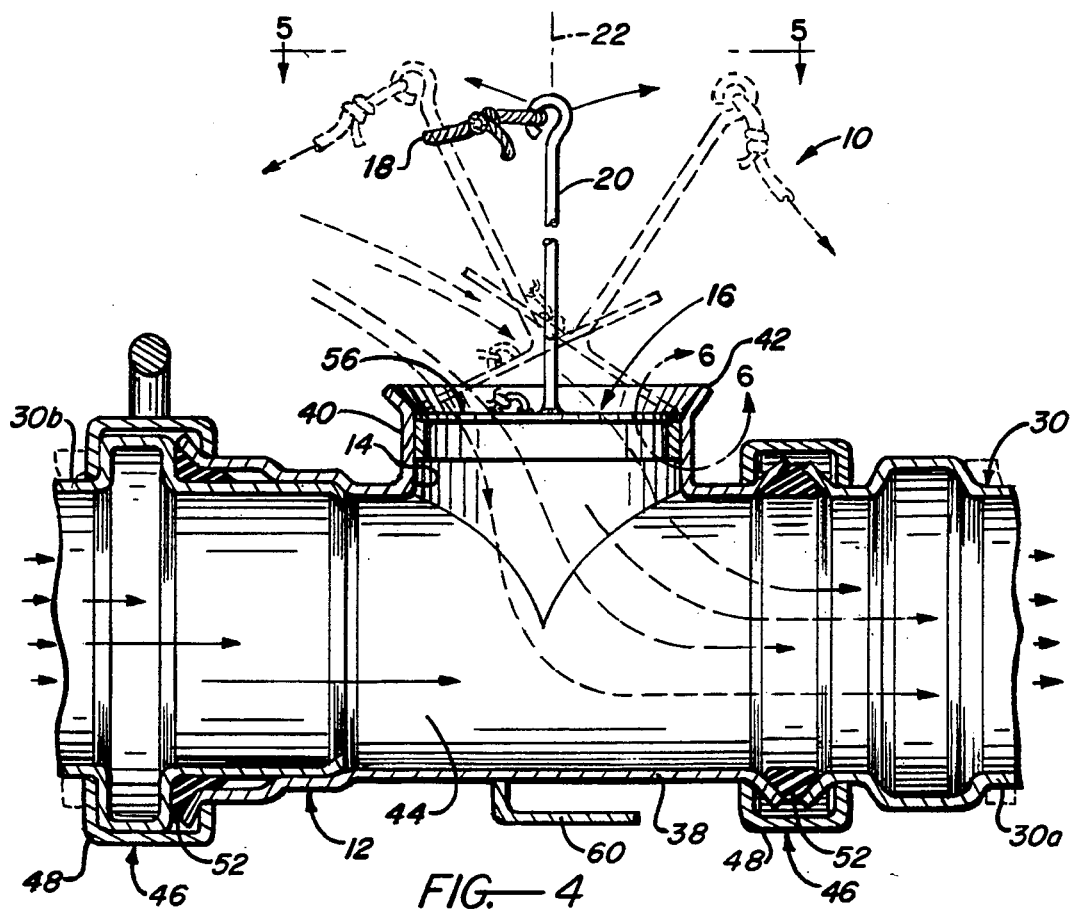
FIG.—4
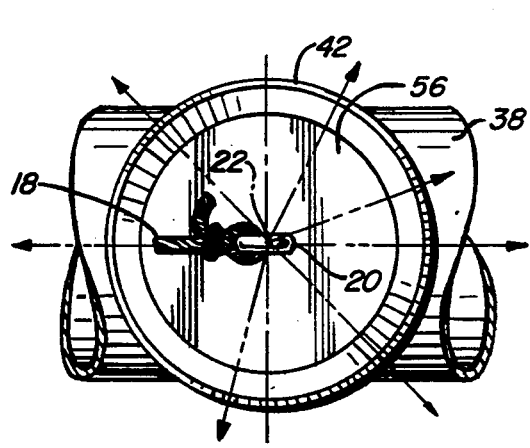
FIG.—5
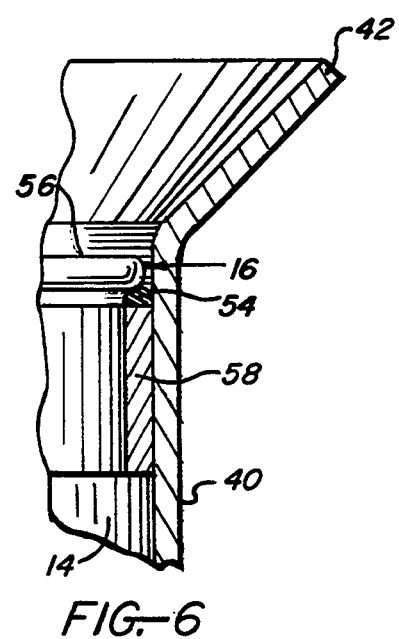
FIG.—6

VACUUM RELIEF VALVE

BACKGROUND OF THE INVENTION

1. Field of the Invention

This invention relates generally to fluid flow control devices and more particularly to a novel fluid valve.

2. Prior Art

The improved valve of this invention is intended for use as a vacuum relief valve in a vacuum system which must be vented to atmosphere under certain conditions. The valve has particular utility in industrial vacuum cleaning systems and for this reason will be described in this context. However, the valve may be used for any other purpose for which it is suitable.

Industrial vacuum cleaning systems are used to clean up a wide variety of debris from sewers, streets, railways, sludge ponds, waste collection areas, and a wide variety of other locations. The debris may be the result of a natural occurrence, such as a flood or hurricane, or the result of an accident such as a truck or rail tank car spill, or the result of deliberate action, and may range from solids, such as dirt, rocks, and other solid debris, through semi-liquids, such as sludge and mud, sometimes laden with solids, to liquids.

Simply stated, an industrial vacuum cleaning system comprises a vacuum or suction line in the form of a flexible hose having an intake end which is held by an operator, and a vacuum source, such as a high velocity blower, for producing high velocity air flow into the hose through its intake end and through the hose to a separator in which the debris is separated from the air. The air is discharge back to the atmosphere, and the debris is conveyed to a collection chamber. In use, the operator moves the intake end of suction hose back and forth over the debris to be vacuumed in such a way that the debris is sucked into the hose.

Industrial vacuum cleaning systems of this kind are commonly mounted on a truck so that they may be transported to debris sites and then to a refuse facility or dump at which the collected debris is off loaded. U.S. Pat. No. 5,030,259 discloses such an industrial vacuuming vehicle.

Industrial vacuum cleaning systems require a powerful vacuum and as a consequence are subject to certain occurrences which requires rapid cutoff of the suction at the intake end of the suction hose. One of these occurrences involves blockage of the inlet end by the debris being collected. Another occurrence involves the hazard of accidental sucking of some part of the body of clothing of the operator or other nearby person into the intake end of the suction hose.

To permit such rapid suction cutoff, it is known to provide the suction hose with a vacuum relief valve at a position close to the intake end of the hose. This valve normally remains closed during vacuuming operation so that all air flow into the hose occurs through its intake end. Opening the relief valve provides a relatively large air by-pass or vacuum relief inlet in the hose downstream of its intake end and thereby substantially reduces the suction at the intake end.

The prior vacuum relief valve has a generally T-shaped body including a tubular portion and a lateral portion between the ends of the tubular portion. A main flow passage extends axially through the tubular body portion. Extending axially through the lateral body portion is a vacuum relief passage which opens at one end to the main flow passage and at its other end to atmosphere. The tubular body portion has couplings at its ends for connecting the valve between two adjacent sections of a vacuum cleaning system hose so that during operation of the system, suction air and debris passes through the flow passage in the tubular body portion.

Journalled on the lateral body portion on an axis transverse to the vacuum relief passage is a spring loaded relief valve flapper situated within the relief passage and a trip lever situated externally of the valve body at one side of the lateral body portion. The relief valve flapper is normally latched closed to block air flow through the relief passage. The trip lever occupies a normal position when the valve flapper is closed and is rotatable in one direction on the transverse axis transverse from this normal position to release the flapper for opening. A tether line is secured at one end to the trip lever and has an opposite free end to be held by the vacuum operator. The operator may quickly open the relief valve at any time to cut off the suction at the intake end of the suction hose by pulling on the tether.

This prior relief valve suffers from the disadvantage that a pull on the tether will open the relief valve only if the direction of the tether relative to the valve when the tether is pulled is within a relatively narrow range of directions. This range of directions is that within which the pulling force exerted on the trip lever through the tether has at least a substantial force component which is (a) transverse to the lever, (b) in the plane of lever rotation, and (c) in the proper direction of lever rotation to open the valve. In the course of using a vacuum cleaning system, however, the operator generally moves about a wide area relative to the relief valve and in so doing, his position relative to the relief valve continuously changes. In many of these relative positions, the direction of the tether relative to the valve may be outside the range of directions necessary to open the valve. For example, if the operator's position when the tether is pulled is such that the tether extends transverse to the plane of rotation of the trip lever, or in a direction opposite to the direction of trip lever rotation necessary to open the valve, the tether pull will not open the valve. Accordingly, there is a need for an improved vacuum relief valve of the character described which avoids the above disadvantage.

SUMMARY OF THE INVENTION

This invention provides a novel valve which is particularly suitable for use as a vacuum relief valve for industrial vacuum cleaning systems and the like and avoids the noted and other disadvantages of the prior vacuum relief valve described above. As mentioned earlier, however, the valve may be used for any purpose of which it is capable. The improved valve is characterized by a unique construction and arrangement whereby the valve may be quickly and easily operated by an operator situated at any position throughout at least almost a full 360 degrees about the valve and with the same ease in every position. The valve construction is also relatively simple and low cost.

According to its broader aspects, the valve has a valve body containing passage, referred to herein in places as a valved passage, valve means in the passage including a valve member movable between open and closed positions for opening and closing the passage, an elongate valve operating member having inner and free ends, and means operatively connecting the inner end of the operating member to the valve member in such a way that the free end of the operating member is movable to any position throughout at least almost a full 360 degrees about a certain axis of the valve body, and a force exerted on the free end of the operating member at any position about the axis moves the valve member from one of its positions to the other.

The preferred valve described herein is particularly adapted for use as a vacuum relief valve in the suction line or hose of an industrial vacuum cleaning system of the kind discussed above. This preferred valve has a generally T-shaped valve body having a tubular portion containing a longitudinal passage, and a lateral portion containing a lateral passage. The longitudinal passage in the tubular body portion provides a main flow passage through the valve and opens through the ends of the tubular body portion. The lateral passage is the valved passage of the valve and functions as a vacuum relief passage. This vacuum relief passage has an inner end opening to the main flow passage between its ends and an outer end opening to the exterior of the valve body.

The valve means in the vacuum relief passage function as relief valve means and includes an outwardly facing valve seat about the relief passage coaxial with the axis of this passage. The relief valve member is insertable into and removable from the vacuum relief passage through its outer end and normally engages the seat to close the relief passage. Fixed to and extending from this valve member along the common axis of the valve seat and relief passage is a rigid stem having an outer end which extends externally of the valve body through the outer end of the relief passage. This stem extends substantially along the common axis of the valve seat and relief passage when the relief valve member occupies its closed position. Fixed to the outer end of this stem is a valve operating member in the form of a tether. Pulling this tether from any direction about the valve tilts the relief valve member about an edge portion of the valve member and the valve seat as a fulcrum to open the relief valve with lever action which multiplies or amplifies the opening force or moment applied to the valve member.

The vacuum relief valve is connected in the vacuum cleaner hose close to its intake end in such a way that suction flow through the hose occurs through the main flow passage of the valve. The hose suction holds the vacuum relief valve member in its closed position. Pulling the valve tether tilts the valve member to open position and thereby vents the suction passage in the hose to atmosphere to cutoff the suction at the intake end of the suction hose. The valve is located sufficiently close to the intake end to enable the vacuum operator to hold the outer end of the tether. The valve has a base which supports the valve in a normal position wherein the axis is generally vertical. The operator may thus open the relief valve from any position throughout at least almost a full 360 degrees about the valve by pulling on the tether.

BRIEF DESCRIPTION OF THE DRAWINGS

FIG. 4 is a longitudinal section through the valve in FIG. 3;

FIG. 5 is a view looking in the direction of the arrows on line 5—5 in FIG. 4; and FIG. 6 is an enlargement of the area encircled by the arrow 6—6 in FIG. 5.

DESCRIPTION OF THE PREFERRED EMBODIMENT

Figure 1:
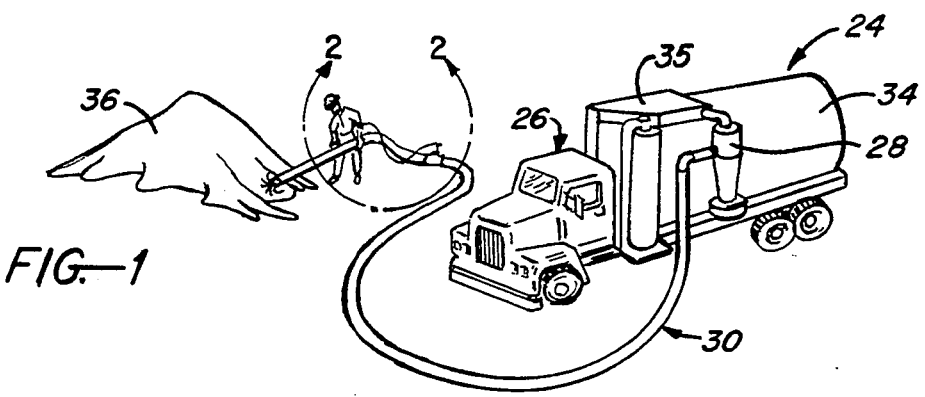
FIG. 1 illustrates a mobile industrial vacuum cleaning system embodying an improved vacuum relief valve according to the invention.

Referring now to these drawings, there is illustrated an improved valve 10 according to the invention. The valve includes a valve body 12 containing a valved passage 14. Within this passage are valve means 16 which are operable between closed and open positions to close and open the passage. An elongate valve operator member 18 has an inner end operatively connected by means 20 to the valve means 16 in such a way that the outer free end of the operating member may be moved to any position throughout at least almost a full 360 degrees about a certain axis 22 of the valve body 12, and a force may be exerted on the operating member at any position to operate the valve means between its closed and open positions.

The preferred valve 10 illustrated is particularly adapted for use as a vacuum relief valve in a suction line, in this case the suction hose of an industrial vacuum cleaning system 24 of the kind discussed earlier and illustrated in FIGS. 1 and 2. Except for the vacuum relief valve 10 of this invention, the industrial vacuum cleaning system 24 illustrated is conventional and similar to that disclosed in the earlier mentioned U.S. Pat. No. 5,030,259. Accordingly, it is unnecessary to describe the vacuuming system 24 in elaborate detail. Suffice it to say that the illustrated system is a mobile vacuum cleaning system including a truck 26 mounting a separator 28, a flexible suction line or hose 30 having an intake end 32 and an opposite end connected to the separator, a collection tank 34 on the truck connected to the separator, and a vacuum or-suction source 35, such as a high speed blower, on the truck for creating a powerful vacuum or suction in the suction hose 30.

Figure 2:
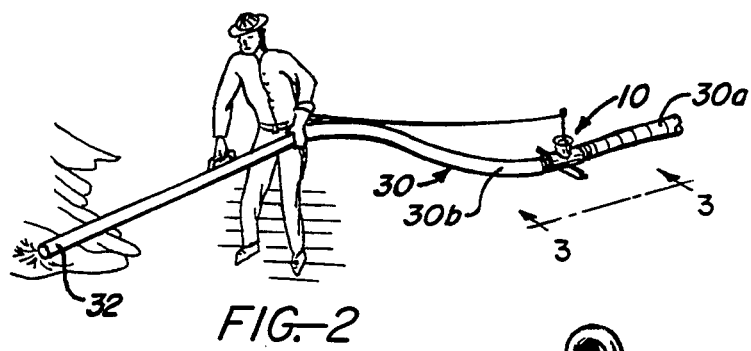
FIG. 2 is an enlargement of the area encircled by the arrow 2—2 in FIG. 1.
Figure 3:
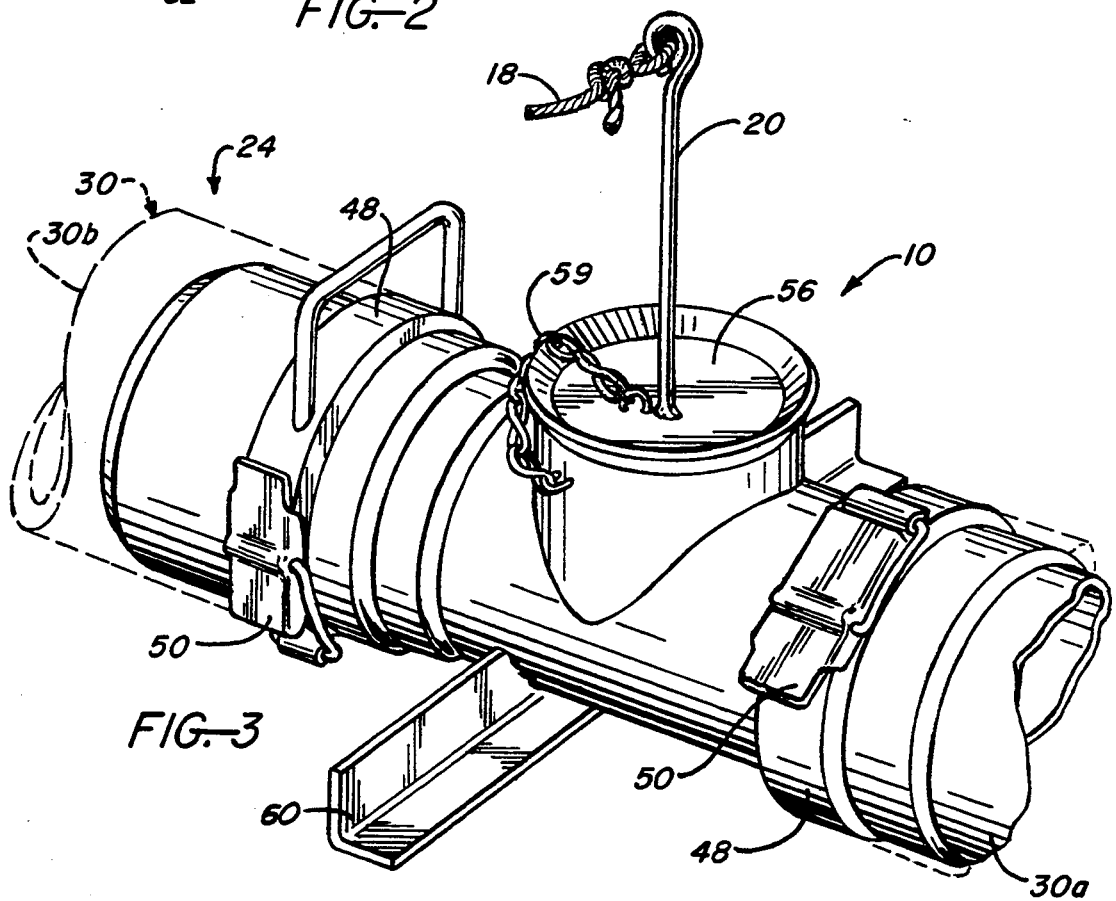
FIG. 3 is a further enlarged perspective view of the present vacuum relief valve embodied in the vacuum cleaning system of FIGS. 1 and 2.

During operation of the vacuum cleaning system 24, the intake end 32 of the suction hose 30 is held by an operator and moved back and forth over debris 36 to be removed, as depicted in FIGS. 1 and 2. Air and debris are sucked into the hose through its intake end and carried to the separator 28 where the debris separated from the air and transferred to the collection tank 34. The air is discharged back to the atmosphere.

The body 12 of vacuum relief valve 10 has a generally T-shape and includes a tubular portion 38 and a lateral portion 40 between the ends of the tubular portion. The lateral body portion has an outwardly flared rim 42. Extending axially through the tubular body portion 38 is a main flow passage 44 which opens through the ends of the tubular portion. The valved passage 14 extends axially through the lateral body portion 40 and functions as a vacuum relief passage. This lateral vacuum relief passage has an inner end opening to the main flow passage 44 between its ends and an outer end opening to the exterior of the valve body.

At the ends of the tubular body portion 38 are couplings 46 for connecting the valve 10 between two adjacent sections 30a, 30b of the suction hose 30. Any conventional couplings may be used for this purpose. The illustrated couplings comprise collars 48 which encircle mating shouldered coupling end portions on the valve body 38 and the hose sections 30a, 30b. The couplings include hinged parts which are locked together in clamping relation with the shoulder end portions of the valve and hose sections by releasable fasteners 50. The valve body and hose sections are sealed to one another by seal rings 52.

The valve means 16 in the lateral suction relief passage 14 comprise vacuum relief valve means. This valve means comprises an outwardly facing annular valve seat 54 about the lateral vacuum relief passage 14 and a valve member 56 which normally engages the valve seat to close the relief passage. Valve seat 54 comprises an O-ring seating on the outer end of a sleeve 58 fixed within the lateral valve body portion 40. The relief passage 14 and the valve seat 54 are coaxially aligned on the axis 22.

Valve member 56 comprises a flat disc having a normal closed position shown in solid lines in the drawings in which the disc seats against the O-ring 54 to close the suction relief passage 14, as shown best in FIG. 6. The valve member 56 is freely insertable into and removable from the vacuum relief passage 14 through the outer end of the passage. A chain 59 attaches the valve member to the valve body to prevent loss of the valve member.

The illustrated valve operating member 18 is a tether, such as a cord, rope, or the like. The means 20 operatively connecting the inner end of the tether to the suction relief valve means 16 comprises a rigid stem. This stem has an inner end rigidly fixed to the center of the valve disc 56 and extends from the disc along its central axis. When the valve disc occupies its closed position, the stem occupies a normal position in which the stem is substantially aligned with and extends substantially along the valve body axis 22. The stem extends well beyond the outer end of the lateral valve housing portion 40 and thus has an outer end portion accessible externally of the valve body.

The inner end of the valve tether 18 is fixed to the outer end of the valve stem 20. The opposite free end of the tether may be moved to any position throughout a full 360 degrees about the valve stem 16 and axis 22, as indicated by the arrows in FIG. 5. The tether may be pulled outwardly from any position and hence in any direction about the stem and axis to open the suction valve means 16 in the manner illustrated in broken lines in FIG. 4 and thereby vent the suction passage in the vacuum hose 30 to atmosphere. In this regard, it will be observed in FIG. 4 that an outward pull on the tether in any direction about the axis 22 tilts the valve disc 56 to a broken line open position about an edge portion of the disc and the valve seat 54 as a fulcrum. Because of the relatively long length of the stem 20, the valve is tilted open with lever action which provides a mechanical advantage that amplifies or multiplies the opening force or moment on the valve disc.

The suction relief valve 10 is connected in the vacuum system suction hose 30 at a position sufficiently close to the intake end 32 of the hose to enable the vacuum operator, who is located at this end of the hose, to hold the outer end of the tether 18. The outer end of the tether may be secured to one arm of the operator, as shown in FIG. 2. The valve 10 has a base 60 for supporting the valve on the ground in a normal position in which the valve body axis 22 is generally upright or substantially vertical.

During operation of the vacuum cleaning system 24, the blower or other suction source 35 of the system creates a strong suction in the suction hose 30 which firmly holds the vacuum relief valve member 56 in its closed position. Suction air flow through the hose occurs through the main flow passage 44 of the suction relief valve 10. The vacuum operator sweeps the intake end 32 of the suction hose 30 back and forth over the debris 36 to be removed. The debris is sucked into the hose through its intake end 32 and is carried through the hose and valve passage 44 to the separator 28 where it is separated from the air and then transferred to the collection tank 34. The air is discharged back to atmosphere.

In the event that the intake end of the hose becomes blocked or some part of the operator's body or clothes is accidentally sucked into the hose, the operator can quickly and easily cut off the suction at the intake end 32 of the hose by pulling on the tether 18 to open the suction relief value 10 by tilting the suction relief valve disc 56 to an open position. This action vents the suction passage in the suction hose 30 to atmosphere and thereby substantially reduces or cuts off the suction at the intake end of the hose.

The earlier explained capability of the suction relief valve 10 to be opened by pulling on the tether 18 from any position or in any direction throughout a full 360 degrees about the valve is a major advantage of the valve over the prior art suction relief valve discussed previously. Thus, during operation of the vacuum cleaning system 24 the operator usually moves about a substantial area around the valve. The operator can open the valve by pulling on the tether from any position or in any direction about the valve. Other advantages of the valve are its simplicity of construction and low cost of manufacture.

I claim:

1. A valve comprising:

a valve body having a passage, a base on said valve body for supporting said body on a surface in a normal position in which a certain axis of said body extends outwardly from the surface.

a valve member in said passage movable between a closed valve position wherein the valve member blocks flow through the passage and an open valve position wherein said valve member permits flow through the passage, and valve operating means including an elongate operating member movable about said certain axis of the valve body for moving said valve member from one of said valve positions to the other valve position in any position of said operating member about said axis.

2. A valve according to claim 1 wherein:

said operating member comprises a tether.

3. A valve comprising:

a valve body having a passage, a valve member in said passage movable between a closed valve position wherein the valve member blocks flow through the passage and an open valve position wherein said valve member permits flow through the passage, valve operating means including an elongate operating member having a free end movable to any position throughout at least almost a full 360 degrees about a certain axis of the valve body and an opposite inner end, and means operatively connecting said inner end of said operating member to said valve member for movement of said valve member from one of said valve positions to the other valve position by a force applied to said free end of said operating member in any position of said free end about said axis, and wherein, said means connecting said inner end of said operating member to said value member comprises a rigid stem having an outer end accessible externally of said body and an inner end connected to said valve member in such a way that the outer end of said stem has a normal position wherein the outer end of the stem extends substantially along said certain axis when said valve member occupies said one valve position, and said valve member is movable from said one valve position to said other valve position by lateral movement of the outer end of said stem from said normal position in any lateral direction of said axis, and said operating member extends laterally from and has its inner end secured to the outer end of said stem, whereby said stem is movable laterally from said normal position to move said valve member from one valve position to the other valve position by an endwise force exerted on the free end of said operating member at any position about said axis.

4. A valve according to claim 3 wherein:
said valve operating member comprises a tether.

5. A valve comprising:
a valve body having a passage,
a valve member in said passage movable between a closed valve position wherein the valve member blocks flow through the passage and an open valve position wherein said valve member permits flow through the passage,
valve operating means including an elongate operating member having a free end movable to any position throughout at least almost a full 360 degrees about a certain axis of the valve body and an opposite inner end, and means operatively connecting said inner end of said operating member to said valve member for movement of said valve member from one of said valve positions to the other valve position by a force applied to said free end of said operating member in any position of said free end about said axis, and wherein
said passage is coaxial with said certain axis and has an outer end opening to the exterior of said valve body,
said valve means further comprises a valve seat about said passage facing the outer end of said passage,
said valve member engages said valve seat about the full circumference of said passage in said closed valve position,
said means connecting said inner end of said operating member to said valve member comprises a rigid stem having an inner end rigidly secured to said valve member and an outer end accessible externally of said body,
said stem occupies a normal position wherein the stem extends substantially along said certain axis when said valve member occupies said closed valve position, and said stem is movable laterally from said normal position in any lateral direction of said axis to tilt said valve member about an edge portion of the valve member and said valve seat as a fulcrum to said open valve position, and
said operating member extends laterally from and has its inner end secured to the outer end of said stem, whereby said stem is movable laterally from said normal position to rotate said valve member from said closed valve position to said open valve position by an endwise force exerted on the free end of said operating member at any position about said axis.

6. A valve according to claim 5 wherein:
said valve operating member comprises a tether.

7. A valve according to claim 1 wherein:
said passage is a first passage,
said valve body contains a second passage having opposite ends opening to the exterior of said body, and
said first passage has an inner end opening to said second passage between the ends of said second passage and an outer end opening to the exterior of said valve body.

8. A valve according to claim 3 wherein:
said passage is a first passage,
said valve body contains a second passage having opposite ends openings to the exterior of said body, and
said first passage has an inner end opening to said second passage between the ends of said second passage and an outer end opening to the exterior of said valve body.

9. A valve according to claim 5 wherein:
said passage is a first passage,
said valve body contains a second passage having opposite ends opening to the exterior of said body,
said first passage has an inner end opening to said second passage between the ends of said second passage.

10. A valve according to claim 9 wherein:
said valve body has a generally T-shape and includes a generally tubular portion, and a lateral portion between the ends of said tubular portion having an inner end joined to said tubular portion and an opposite outer end,
said second passage is a main flow passage extending longitudinally through and opening though the ends of said tubular portion,
said valve is a vacuum relief valve for a vacuum system, such as an industrial vacuum cleaning system, including a suction line, and a vacuum source for sucking material through said suction line,
said valve body has coupling portions at said ends of said tubular body portion for connecting said valve in said suction line,
said first passage is a vacuum relief passage extending longitudinally through said lateral body portion,
said valve member is a relatively flat plate, and
said operating member comprises a flexible tether by which said stem may be pulled in any lateral direction of said axis to tilt said valve member to open position.

11. A valve according to claim 10 wherein:
said valve member is freely removable from and insertable into said first passage through the outer end of said first passage.

12. A valve according to claim 10 including:
a base on said valve for supporting said valve in a normal position wherein said certain axis is generally vertical.

13. In combination:
a vacuum system comprising a flexible suction hose having an intake end to be held and moved about by an operator, a vacuum source connected to the other end of said hose for sucking material through said intake end, a suction relief valve connected to said hose containing a flow passage through which the material passes, and a base on said valve for supporting said valve on a surface in a normal position wherein a certain axis of said valve extends outwardly from the surface, and wherein said valve comprises a valve body having a vacuum relief passage opening at one end to said flow passage and at the other end to the exterior of said valve body, a valve member in said vacuum relief passage movable between a closed valve position wherein the valve member blocks flow through said vacuum relief passage and an open valve position wherein said valve member permits flow through said vacuum relief passage, and valve operating means including an elongate operating member extendable from said valve to a position adjacent said intake end of said hose and movable about said certain axis for moving said valve member from one valve position to the other valve position in any position of said operating member about said certain axis.

14. In combination:

a vacuum system comprising a suction line connected to a vacuum source for sucking material through said line, a suction relief valve in said suction line containing a flow passage through which the material passes, and means for supporting said valve in a normal position wherein a certain axis of said valve is generally upright, and wherein said valve comprises a valve body having a vacuum relief passage opening at one end to said flow passage and at the other end to the exterior of said value body, a valve member in said vacuum relief passage movable between a closed valve position wherein the valve member blocks flow through said vacuum relief passage and an open valve position wherein said valve member permits flow through said vacuum relief passage, and valve operating means including an elongate operating member having a free end movable to any position throughout at least almost a full 360 degrees about said certain axis and an inner end, and means operatively connecting said inner end of said operating member to said valve member for movement of said valve member from one valve position to the other valve position by a lateral force applied to said outer end of said operating member through said operating member in any lateral direction of said certain axis.

said means connecting said inner end of said operating member to said valve member comprises a rigid stem having an outer end accessible externally of said body and an inner end connected to said valve member in such a way that the outer end of said stem has a normal position wherein the outer end of the stem is substantially aligned with said certain axis when said valve member occupies said one valve position, and said valve member is movable from said one position to the said other valve position by lateral movement of the outer end of said stem from said normal position in any lateral direction of said axis, and said operating member extends laterally from and has its inner end secured to the outer end of said stem, whereby said stem is movable laterally from said normal position to move said valve member from said one valve position to the other valve position by an endwise force exerted on the free end of said operating member at any position about said axis.

15. The combination of claim 13 wherein:

said relief passage is coaxial with said certain axis and has an outer end opening to the exterior of said valve body, said valve means further comprises a valve seat about said relief passage facing the outer end of said relief passage, said valve member engages said valve seat about the full circumference of said relief passage in said closed valve position, said means connecting said inner end of said operating member to said valve member comprises a rigid stem having an inner end rigidly secured to said valve member and an outer end accessible externally of said body, said stem occupies a normal position wherein the stem extends substantially along said certain axis when said valve member occupies its normal closed valve position, and said stem is movable laterally from said normal position in any lateral direction of said axis to tilt said valve member about an edge portion of the valve member and said valve seat as a fulcrum to said open valve position, and said operating member extends laterally from and has its inner end secured to the outer end of said stem, whereby said stem is movable laterally from said normal position to tilt said valve member from said closed valve position to said open valve position by an endwise force exerted on the free end of said operating member at any position about said axis.

16. The combination of claim 15 wherein:

said vacuum system is a vacuum cleaning system, said suction line comprises a flexible suction hose having an intake end through which debris can be sucked into the hose and which is movable back and forth by an operator to over debris to be vacuumed up, and said operating member comprises a tether whose free end may be held by the operator and pulled in any lateral direction of said certain axis to open said vacuum relief valve.

17. The combination of claim 13 wherein:

said valve member is freely removable from and insertable into said relief passage through said other end of said relief passage.

18. For use in a vacuum system for vacuuming material from a surface, the combination comprising:

a flexible suction hose having an intake end to be held by an operator and moved over the surface to be vacuumed and an opposite end for communication to a vacuum source for sucking material into the hose through said intake end, a valve connected to said hose and operable between first and second states for controlling the vacuum at said intake end of the hose to control suction of material into said intake end when said opposite end of the hose communicates to a vacuum source, means for supporting said valve on the surface to be vacuumed in a position such that movement of said intake end over the surface occurs about a certain axis of the valve, and valve operating means movable about said valve axis for operating said valve from one state to the other in every position of said valve operating means about said axis and positionable adjacent said intake end of the hose in every position of said intake end about said valve axis, whereby an operator holding said intake end of the hose may operate the valve from said intake end of the hose in every position of said intake end about said axis.

19. The combination according to claim 18 wherein:

said valve and hose contain a flow passage through which passes material entering said intake end of said hose, and said valve is a vacuum relief valve having a vacuum relief passage communicating said flow passage to atmosphere, and relief valve means operable by said valve operating means for closing said relief passage in one of said valve states and opening said relief passage in the other valve state.

20. The combination of claim 19 wherein:

said vacuum relief passage is coaxial with said valve axis and has an outer end opening to atmosphere, said relief valve means comprises a valve seat about and facing the outer end of said relief passage, a valve member having a closed position of engagement with said valve seat and an open position spaced from said valve seat, and a stem fixed to said valve member and extending beyond the outer end of said relief passage when said valve member occupies its closed position, and said valve operating means comprises a tether having one end secured to said stern and a length such that tile other end of the tether is positionable adjacent said intake end of said hose in every position of said intake end about said valve axis.

21. For use in a vacuum system for vacuuming material from a surface, a valve comprising:

a valve body containing a flow passage having a first end for communication to a vacuum source and an opposite end, and valve means operable between first and second states for controlling the vacuum at said opposite passage end when said first passage end communicates to a vacuum source, means connected to said valve body for supporting the valve body on the surface to be vacuumed in a normal position wherein a certain axis of the valve body extends outwardly from the surface, and valve operating means movable about said valve axis and accessible at a substantial distance from said axis for operating said valve from one state to the other in every position of said valve operating means about said axis.

22. A valve according to claim 21 wherein:

said valve is a vacuum relief valve having a vacuum relief passage communicating said flow passage to atmosphere between said ends of the flow passage, and said valve means comprise relief valve means operable by said valve operating means for closing said relief passage in one of said valve states and opening said relief passage in the other valve state.

23. A valve according to claim 22 wherein:

said vacuum relief passage is coaxial with said valve axis and has an outer end opening to atmosphere, said relief valve means comprises a valve seat about and facing the outer end of said relief passage, a valve member having a closed position of engagement with said valve seat and an open position spaced from said valve seat, and a stem fixed to said valve member and extending beyond the outer end of said relief passage when said valve member occupies its closed position, and said valve operating means comprises a tether secured to said stem.

24. A vacuum system for vacuuming material from a surface comprising:

a flexible suction hose having an intake end to be held by an operator and moved over the surface to be vacuumed and an opposite end, a vacuum source connected to said opposite end of said hose for sucking material into the hose through said intake end, a valve operable between first and second states for controlling the vacuum at said intake end of the hose to control suction of material into said intake end, means for supporting said valve on the surface to be vacuumed in a position such that movement of said intake end of said hose over the sur face occurs about a certain axis of the valve , and valve operating, and wherein said valve operating means is movable about said valve axis for operating said valve from one state to the other in every position of said valve operating means about said axis and is positionable adjacent said intake end of the hose in every position of said operating means and intake end about said valve axis, whereby an operator holding said intake end of the hose may operate the valve from one state to the other from said intake end of the hose in every position of said intake end about said axis.

25. A vacuum system according to claim 24 wherein:

said valve and hose contain a flow passage through which passes material entering said intake end of said hose, and said valve is a vacuum relief valve having a vacuum relief passage communicating said flow passage to atmosphere, and relief valve means operable by said valve operating means for closing said relief passage in one of said valve states and opening said relief passage in the other valve state.

26. A vacuum system according to claim 25 wherein:

said vacuum relief passage is coaxial with said valve axis and has an outer end opening to atmosphere, said relief valve means comprises a valve seat about and facing the outer end of said relief passage, a valve member having a closed position of engagement with said valve seat and an open position spaced from said valve seat, and a stem fixed to said valve member and extending beyond the outer end of said relief passage when said valve member occupies its closed position, and said valve operating means comprises a tether having one end secured to said stem and a length such that the other end of the tether is positionable adjacent said intake end of said hose in every position of said intake end about said valve axis.

* * * * *